3,479,590
Patented Nov. 18, 1969

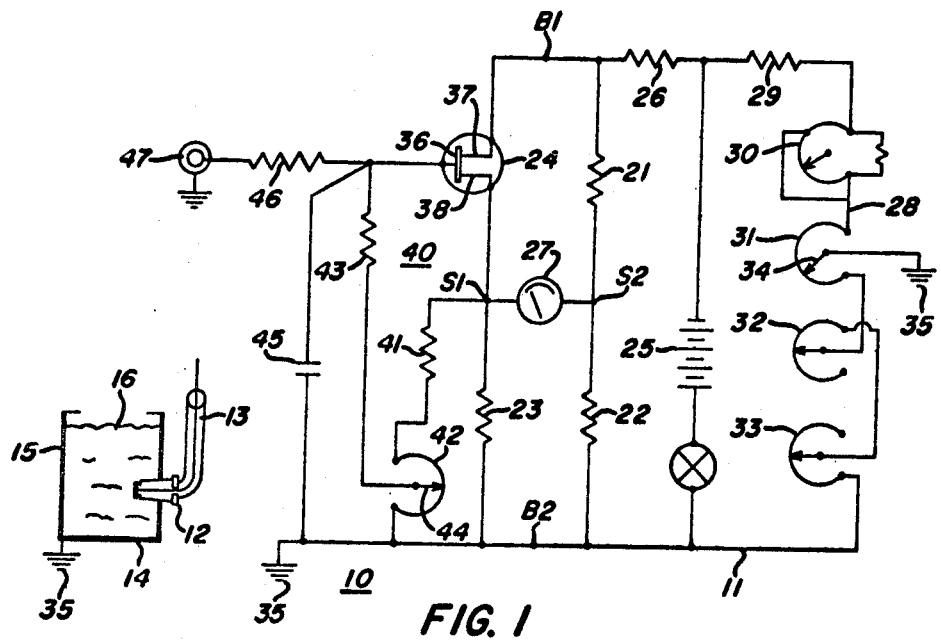
FIG. 1
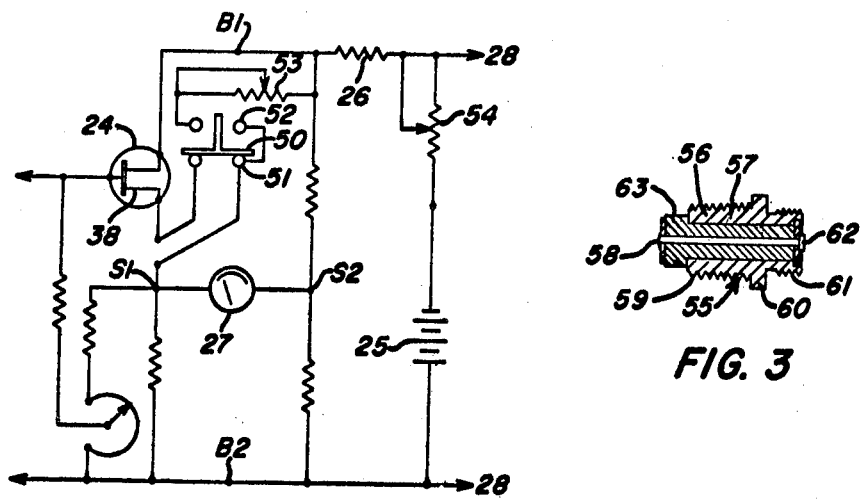
FIG. 2
FIG. 3
INVENTOR.
LEONARD L. HENDERSON
BY
ATTORNEY _United States Patent Office_

3,479,590
BRIDGE FOR MEASURING MOISTURE CONTENT HAVING FIELD EFFECT TRANSISTOR IN ONE ARM WITH GATE ELECTRODE RESISTIVELY CONNECTED THROUGH TEST LIQUID
Leonard L. Henderson, 1014 Central Parkway, Warren, Ohio 44484
Filed Dec. 4, 1967, Ser. No. 687,678
Int. Cl. G01r 27/02
U.S. Cl. 324—65          11 Claims

ABSTRACT OF THE DISCLOSURE

A conductivity measuring apparatus useful for determining moisture content of non-conductive liquids in which a field effect transistor is used for high sensitivity with low test potentials. The FET is connected in one arm of a four arm bridge and its gate electrode is resistively connected through the test liquid to ground. A compensating circuit in shunt with the FET provides for operation over a wide range of liquid conductivities.

---

This invention relates to a conductivity measuring and sensing device and particularly to apparatus for determining moisture content of non-conductive fluids.

Applicant has heretofore constructed a novel apparatus for moisture determination and control. As described in United States Patent 2,940,287, issued June 14, 1960, a conductivity pick-up having physically small electrodes, low capacitance and high impedance controls a vacuum tube bridge so adjusted that the balance or imbalance of the bridge is determined by the conduction of the current path through the liquid media between the electrodes. The system is characterized particularly in the small size of the electrodes, the sensitivity to small quantities and proportions of moisture, and in the provision of compensating adjustments for physical parameters, such as the temperature of the liquid and the like.

The present invention relates to improvements in the bridge and in the input circuit to the bridge which connects with the low capacitance pick-up. More particularly, there is described herein an arrangement for obtaining high input impedance and very high sensitivity to changes in conductivity of the liquid medium at the pick-up. According to the invention, the improvement is effected by the use of a field effect transistor, also referred to as a FET, which is utilized in one arm of the bridge with suitable polarizing means and polarizing and compensating resistors.

By the use of a field effect transistor, a very high input impedance is obtained while retaining the advantageous features of the prior circuit arrangement as to adjustment and control of response to various physical parameters. The apparatus utilizes a test potential circuit having a low test potential, e.g., in the order of one to five volts.

The apparatus described herein is useful for moisture measurement and control in a wide variety of applications and circumstances, and particularly in determining very low moisture concentrations in non-conducting liquids.

The invention will be further understood from the following detailed specification and claims, taken in connection with the appended drawing, in which:

FIG. 1 is a circuit diagram of the improved electric circuit which constitutes the invention;

FIG. 2 illustrates test apparatus for use in the circuit of FIG. 1; and

FIG. 3 shows an improved pick-up useful in the practice of the invention.

Referring now to FIG. 1, there is shown an electric moisture analyzer 10, comprising an electric circuit 11, a pick-up 12, and a cable 13 operatively associate with an apparatus 14 comprising, for example, a container 15 and a body of liquid 16. The liquid 16 may be of various compositions and the analyzer 10 is utilized to determine the moisture present in the liquid, according to the specific electrical conductivity imparted to the liquid by the moisture. For this purpose the conductivity of the body of liquid in dry condition or without moisture is known in advance or is determined as one step of the measurement prior to the introduction of the moisture.

The electric circuit 11 comprises a modification of the corresponding electric circuit of U.S. Patent 2,940,287 and includes a bridge constituted by three resistors 21, 22, and 23, comprising with the associated resistances three arms of the bridge, and a FET 24 comprising the fourth arm of the bridge. A battery 25 is connected to the input terminals B1 and B2 of the bridge through energizing switch 25A, and a resistor 26 to constitute a voltage source or supply means for the bridge. A meter 27 is connected to the output terminals S1 and S2 of the bridge to indicate the balance or imbalance condition of the bridge according to the proportional resistance of the arm of the bridge and including the resistance determined by the conductivity of the FET 24.

A balance circuit 28, comprising a series arrangement of a resistor 29 and a plurality of potentiometers 30, 31, 32, and 33, is connected in shunt with the battery 25 and the input terminals B1 and B2 of the bridge through the resistor 26. The slider 34 of the potentiometer 31 is connected to a ground 35, common to the circuit 11, the pick-up 12, and the container 15. Accordingly, the input terminal B1 of the bridge is negative with respect to ground and the input terminal B2 of the bridge positive with respect to ground, and the polarity of the gate electrode 36 with respect to the collector electrode 37 and the source electrode 38 of the FET 24 is determined by the adjustment of the slider 34 of the potentiometer 31. Changes in the voltage of the gate 36 with respect to ground, brought about by changes in the conductivity of the liquid, vary the conductivity of the FET 24 and, accordingly, the resistance of that arm of the bridge so that the balance or imbalance of the bridge and the indication of the meter 27 is determined by the conductivity of the liquid 16.

The FET comprises a junction-type field effect transistor having a P-channel operating in the depletion mode. Accordingly, the potentiometer 31 is adjusted in relation to the circuit parameters of the electric circuit 11 and the resistance of the liquid 16 such that an appropriate negative bias is applied to the gate electrode 36 and the bridge 20 is in a balanced condition for a predetermined value of conductivity of the liquid 16. Changes from the balanced condition, brought about by changes in the conductivity of the FET 24, are indicated by movement of the meter 27 from a normal or balanced condition to provide an indication of the conductivity or change in conductivity of the liquid 16 and, accordingly, of the moisture content of the liquid.

The present invention relates principally to the embodiment of the FET 24 in the bridge 20 and in the provision of a compensating circuit 40 for the input to the bridge 20 and the FET 24.

The circuit 40 comprises a resistor 41 and a potentiometer 42 connected in series across the resistor 23 from the output terminal S1 to the input terminal B2 of the bridge 20. A resistor 43 is connected from the gate electrode 36 of the FET 24 to the slider 44 of the potentiometer 42. The resistor 43 comprises a very high resistance, for example, in the range from 1 megohm to 22 megohms or more, and the resistance of the potentiometer 42 may be determined by the comparative values of the resistors 21, 22, and 23 and the intended operating point of the FET 24. A capacitor 45 connected in shunt with the resistor 43 and the potentiometer 44 functions as a stabilizing condenser, and a resistor 46 connected between the gate electrode 36 and the terminal connector 47 of the cable 13 functions as an isolating resistor. The isolating resistor 46 has a value smaller than the resistance of the liquid 16 by several orders of magnitude and functions only to protect the FET 24 against opens or shorts in the associated circuits.

According to the principles set forth in U.S. Patent 2,940,287, referred to above, the circuit which includes the potentiometer 31, the bridge 20, the FET 24, the compensating circuit 40, the isolating resistor 46, the cable 13, and the pick-up 12 comprises a test potential circuit with the ground 35 as a return circuit and the test potential applied to the liquid 16 by the electrodes of the pick-up 12. Adjustment of the potentiometer 34 determines the potential applied between the electrodes of the pick-up and the energizing potential for determining the conductivity of the liquid 16, as determining the current flow in the test potential circuit.

The compensating circuit 40 functions as a shunt conductivity from the gate electrode 36 to the input terminal B2 of the bridge 20 and, accordingly, to the positive electrode of the battery 25, being effectively in shunt with the circuit which includes the resistor 46 and the electrode 47 of the pick-up 12 and the conducting paths through the liquid 16. The resistor 41 is in shunt with the resistor 23 of the bridge and is, in one embodiment, of the same order of magnitude as the resistance of the potentiometer 42. Thus, the potentiometer 42 determines the bias of the FET 24 and adjustment of the potentiometer comprises an effective scale adjustment of the meter 27. Accordingly, the operating point of the FET 24 is changed by adjustment of the conductivity of the input circuit corresponding to adjustment of the arm S1, B2 of the bridge, so that the response of the bridge is varied over a range suitable to accommodate a range of conductivities of the liquid 16. The range of conductivities intended to be determined by the apparatus 10 determines the value of the resistor 43 and the resistor 41 and the potentiometer 42 in relation to the resistors 21, 22, and 23 and the functional parameters of the FET 24 over the intended operating range of the FET 24.

The potentiometer 42 comprises a scale adjustment determining the response of the circuit for additives to the liquid 16. Change in conductivity of the liquid produced by a given quantity of additive is compensated according to the quantity added to the liquid 16. Likewise, the potentiometer 42 comprises a scale adjustment for the FET 24 enabling adjustment of the circuit to correspond to or complement the characteristics of the specific FET device embodied in the circuit. Accordingly, the FET 24 may be replaced without replacement of or redesign of other circuit elements.

The potentiometer 31 comprises a calibration adjustment of the circuit 11 for the temperature of the liquid 16. The potentiometers 30, 32, and 33 constitute calibration adjustments for the composition of the liquid 16 according to the components thereof, a measure of the total conductivity of the composite liquid in the absence of moisture being provided by the combined effect of the potentiometers 30 to 33.

It is an important feature or result of the invention that great sensitivity and range are obtained with low test potentials. Thus, the test potential at the pick-up 12 due to the polarizing voltage and adjustment of the potentiometer 31 may be in the order of .5 volt to 5 or 10 volts although one volt is generally sufficient to measure conductivities or changes in conductivity in the range from thousands of ohms to thousands of megohms.

The circuit arrangement of FIG. 2 comprises a calibration adjustment of the bridge 20 for variations in the voltage of the battery 25. As therein shown, the circuit comprises, in addition to the elements illustrated and described in FIG. 1, a double pole double throw switch 50 having two normally closed contacts 51 connected in series between the collector 38 of the FET 24 and the terminal S1 of the bridge 20, and two normally open contacts 52 connected in series from the terminal S1 to the terminal B1, through an adjustable resistor 53. A second adjustable resistor 54 is connected in series between the battery 25 and the resistor 26.

The resistor 53 and resistor 54 are adjusted so that a standard condition of the bridge is obtained with a known potential of the battery 25. Accordingly, at any time during operation of the apparatus 10, the condition of the circuit with the respect to the voltage of the battery 25 may be determined by actuating the switch 50 and observing the meter 27 for an indication of the standard condition. If, as determined from the indication of the meter 27, the voltage of the battery 25 is changed, the resistor 54 may be adjusted to the standard test condition, again as maintained by the meter 27. The circuit is also useful for determining and compensating for changes in the characteristics of the FET 24 or other components of the circuit. To this end, the resistors 21, 22, 23, and 53 should be carefully chosen high quality components.

The pick-up 55, shown in FIG. 3, comprises a low capacitance arrangement of electrodes particularly adapted for use with the electric circuit 11 of FIG. 1. As shown in FIG. 3, the pick-up 55 comprises a metal shell 56, an insulator 57, and a coaxial electrode 58. The shell 56 comprises an interior part 59 which has the exterior surface threaded for insertion in an opening in the container 14, a flange 60 comprising a stop, and an exterior portion 61 for receiving a connector of the cable 13. The electrode 58 is supported by the insulator 57 and a conductor 62 extends from the electrode 58, through the insulator, to the exterior prat 61 for engagement by the connector of the cable 13. The arrangement is such that the area of the electrode 58 and the exterior surface 63 of the insulator 57 determine the electrostatic field produced by the test potential, the current paths in the liquid 16, and the flow of electric current in the test potential circuit. The insulator 57 is a plastic or ceramic material having an intrinsic conductivity lower than that of the liquid or materials being measured.

In an exemplary embodiment of the invention, the apparatus 14 comprises a drycleaning machine of known design and the liquid 16 comprises the drycleaning medium such as, for example, a synthetic solvent such as perchlorethylene or a petroleum base solvent having specific resistivities in the order of 100 megohms or more. According to the invention, the potentiometer 30 comprises an adjustment for the temperature of the drycleaning fluid, the potentiometer 32 comprises an adjustment for the proportion of soap in the fluid, and the potentiometer 33 comprises a calibration adjustment of the polarizing voltage and test potential so that the meter scales are made to correspond with the component factors of the liquid 16. Thus, the dial of the potentiometer 30 may be calibrated in temperature, the dial of the potentiometer 32 calibrated in soap number corresponding to the characteristics of the drycleaning fluid, and the potentiometer 31 calibrated in percentage of soap as determined for the specific fluid.

As so embodied, the apparatus described herein is useful for determining moisture concentrations to .001 to .05 percent liquid or lower. Upper limits of moisture concentration are determined by other considerations and may be measured to one percent liquid as a useful range of indication for the meter 27. The soap calibration may range from zero to 4 percent, for example, and the test potential range from 1.75 to 2.25 volts.

In drycleaning machines, the capacitor 45 is of particular importance in damping out effects of static charges and mechanical action generated by the machine.

A resistor having a fixed or variable tap may be utilized in place of the potentiometer 42 or in place of any of the potentiometers 30 to 33 in circumstances where liquids of fixed or known composition are utilized, or a great degree of control may be exercised during formulation or mixture of the materials. In alternate embodiments, an N-type FET may be used with reversal of connections and known AC or AC–DC power supplies with suitable regulators may be used instead of the battery 25.

The term "ground" is used herein to refer to a common connection of any kind including connections through containers, chassis, and the like, and does not imply any particular form of connection such as an earth ground.

I claim:

1. Electrical apparatus for conductivity measurement, including a pick-up comprising a sensing electrode adapted for contact with the body to be measured, auxiliary means for a return circuit from the said body, an electrical circuit comprising a field effect transistor (FET), a connection from the FET gate to the pick-up electrode, an electrical bridge comprising the FET as one arm thereof and three resistive arms, the said bridge having two input terminals and two output terminals and the FET having one electrode thereof connected to one input terminal and another electrode thereof connected to one output terminal to constitute one arm of the bridge, an energizing circuit including electric supply means connected to the two input terminals of the said bridge, and a balance circuit connected in shunt with the said supply means and input terminals, comprising a plurality of potentiometers connected in series, one potentiometer having the slider thereof connected to said electric circuit through the return circuit, the pick-up and the gate of the FET to determine a test potential at the body, the conductivity of the FET and the balance-imbalance condition of the bridge being determined by the conductivity of the body.

2. Electrical apparatus in accordance with claim 1, and a compensating circuit comprising a resistor and potentiometer connected from said one output terminal to the remaining one of the said input terminals of the bridge and a connection from the slider of the said last-named potentiometer to the gate of the FET, the said connection having a high resistance resistor in series therewith, the compensating circuit comprising means for adjusting the bias on the gate of the FET and the sensitivity and response of the circuit.

3. Apparatus for moisture determination in liquids, including a conductivity pick-up comprising at least one insulated sensing electrode and auxiliary electrode means adapted for contact with the body of liquid, including means for ground return through the body of liquid and the said auxiliary electrode, an electrical circuit for measuring the conductivity of the liquid in which the said pick-up is immersed, comprising a field effect transistor (FET), a connection from the FET gate to the insulated electrode of the pick-up, an electrical bridge comprising the FET as one arm thereof and three resistive arms, the said bridge having two input terminals and two output terminals and the FET having one electrode thereof connected to one input terminal and another electrode thereof connected to one output terminal, responsive means connected to the output terminals of the bridge, an energizing circuit including electric supply means connected to the two input terminals of the said bridge, and a balance circuit connected in shunt with the said supply means and input terminals, comprising a plurality of potentiometers connected in series, one potentiometer having the slider thereof connected to said electric circuit through the return circuit, the pick-up and the gate of the FET to determine a test potential across the body, the conductivity of the FET and the balance-imbalance condition of the bridge being determined by the conductivity of the liquid, and a compensating circuit comprising a resistive means comprising a potentiometer connected from said one output terminal to the remaining one of the said input terminals of the bridge and a connection from the slider of the said last-named potentiometer to the gate of the FET, the last-named connection having a high resistance resistor in series therewith, the compensating circuit comprising means for adjusting the bias on the gate of the FET and response of the circuit to moisture in the liquid.

4. Apparatus in accordance with claim 3, with an isolating resistor connected between the FET gate and the pick-up electrode between the said connection and the electrode, and a capacitor connected from the FET gate to the said remaining input terminal of the bridge and in shunt with the said compensating circuit, all for stabilizing the input to the FET.

5. Apparatus in accordance with claim 3, in which the named potentiometer in the balance circuit comprises an adjustment of the electric circuit for temperature of the fluid.

6. Apparatus in accordance with claim 5, with a potentiometer connected in the said balance circuit in series with the named potentiometer and comprising means for adjusting the electrical circuit in accordance with the conductivity of the liquid in the absence of moisture.

7. Apparatus in accordance with claim 3, in which the conductivity pick-up comprises a metal sensing electrode, a metal shell adapted for mounting in the wall of the container which carries the liquid, and a body of low conductivity insulating material supporting the sensing electrode coaxially of the shell, the sensing electrode extending transversely across the body of insulation over the outer face thereof.

8. In the combination with the apparatus of claim 3, a drycleaning machine and the conductivity pick-up arranged in the fluid container of the machine.

9. Apparatus in accordance with claim 8 and, in combination therewith, a body of drycleaning fluid in the container and the said pick-up and circuit indicating moisture concentrations in the fluid during operatoin of the machine.

10. Apparatus in accordance with claim 9 and moisture concentrations in the range from about .05 percent liquid to about one percent liquid.

11. Apparatus in accordance with claim 9 with a stabilizing capacitor connected across the pick-up in the circuit.

References Cited
UNITED STATES PATENTS

| | | | |
|---|---|---|---|
| 2,900,531 | 8/1959 | Wallmark | 307—205 |
| 2,940,287 | 6/1960 | Henderson | 324—30 X |
| 2,950,601 | 8/1960 | Wightman | 61—0.5 |
| 3,054,049 | 9/1962 | Chance | 324—54 |
| 3,264,557 | 8/1966 | Heeps | 324—65 |

OTHER REFERENCES

Soltz, Daniel J., High MOS Impedance Benefits pH Measurement, in Electronics, p. 79, July 11, 1966.

EDWARD E. KUBASIEWICZ, Primary Examiner

J. M. HANLEY, Assistant Examiner

U.S. Cl. X.R.

307—205; 324—30